July 23, 1935.  E. M. BUCHAN  2,009,042
PIPE CLAMP
Filed June 8, 1933   2 Sheets-Sheet 1
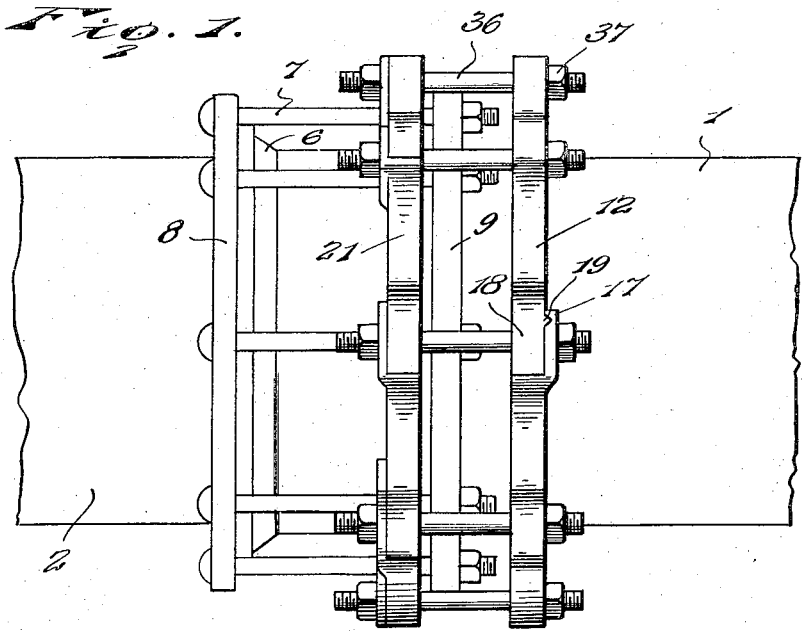
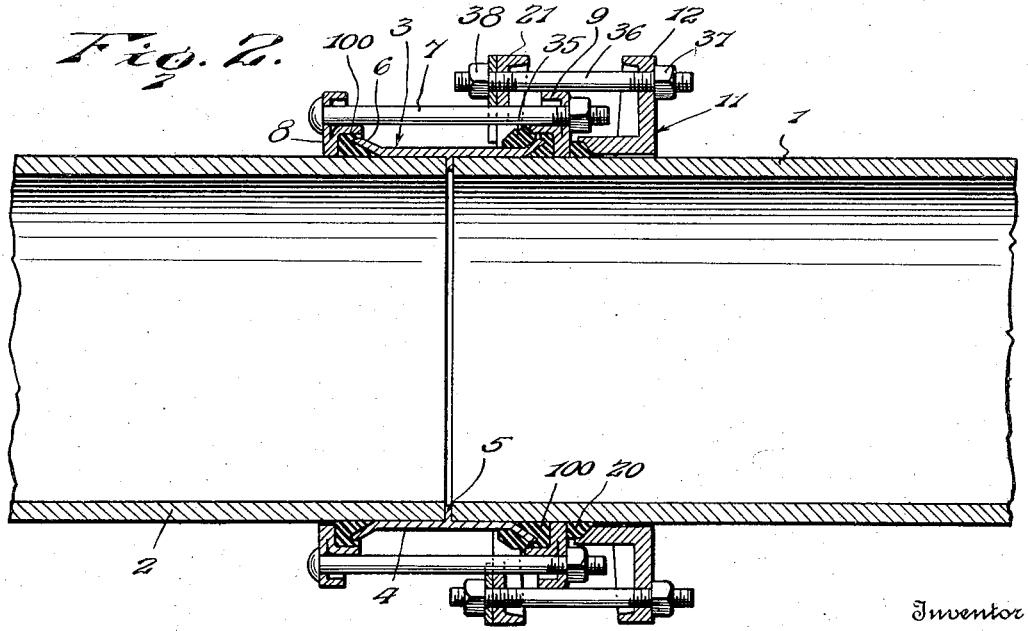
Inventor
E. M. Buchan.
By Lacey & Lacey, Attorneys

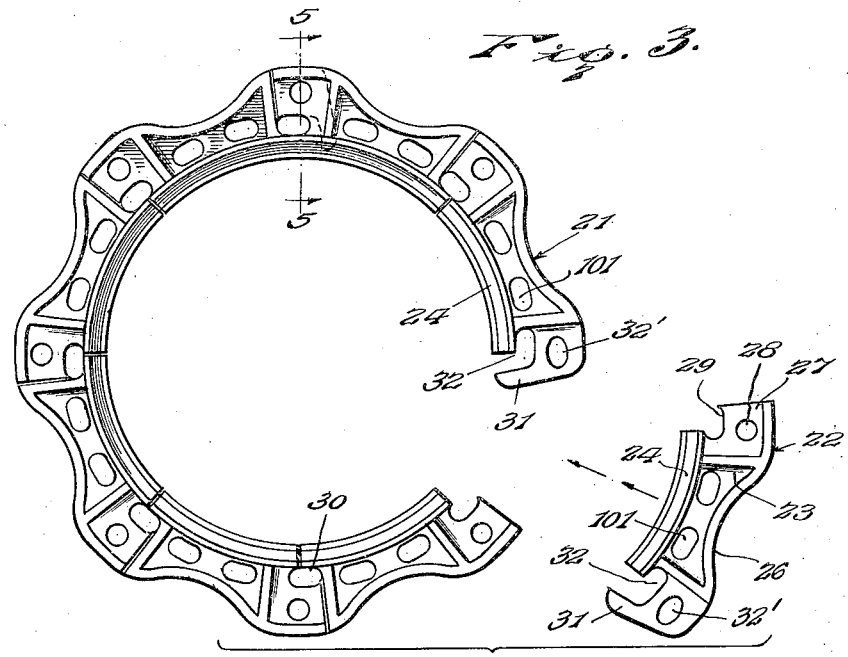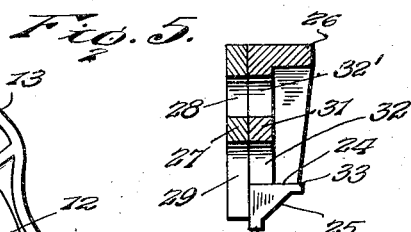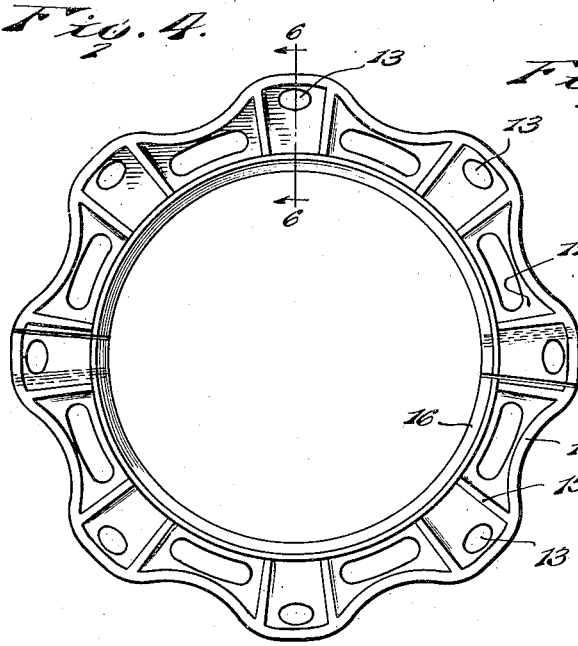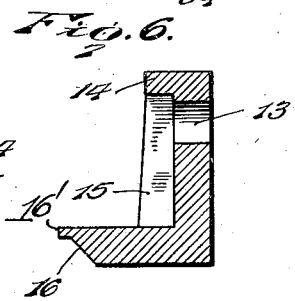

Patented July 23, 1935

2,009,042

UNITED STATES PATENT OFFICE 2,009,042

PIPE CLAMP

Eric M. Buchan, Oxford, Ala.

Application June 8, 1933, Serial No. 674,950

10 Claims. (Cl. 285—132)

This invention relates to an improved clamp which is particularly adapted to cooperate with a coupling employed for securing the meeting ends of pipes together so that leakage at the joint caused by wear of the coupling may be stopped without draining the pipe line and removing the coupling.

Another object of the invention is to provide a clamp which may be readily installed and which, after installation, will not require further attention.

A further object of the invention is to provide a clamp which will be adapted to coact with the coupling at both sides of its ends without the use of a complete cover over the coupling, thereby reducing the expense of the installation to a minimum.

A further object of the invention is to provide a device of this character wherein the gaskets employed are adapted completely to surround the pipe and coupling so that a complete seal will be provided.

Other and incidental objects of the invention, not specifically mentioned in the foregoing, will be apparent as the description of the invention proceeds.

In the drawings forming a part of my application, Figure 1 is a side elevation showing my improved clamp mounted in operative position, Figure 2 is a longitudinal sectional view of my clamp installed, Figure 3 is a plan view showing the sectional inner ring employed, one of said sections being removed and positioned for replacement, Figure 4 is a plan view of the outer ring employed, Figure 5 is an enlarged fragmentary detail sectional view taken on the line 5—5 of Figure 3, and looking in the direction indicated by the arrows, and Figure 6 is an enlarged fragmentary detail sectional view taken on the line 6—6 of Figure 4.

Referring now more particularly to the accompanying drawings wherein like numerals of reference designate like parts throughout the several views, the numerals 1 and 2 indicate meeting end portions of pipes which may be used for any desired purpose, as, for instance, gas mains. The end portions of the pipes are connected by means of a coupling, which is indicated in general by the numeral 3. The coupling comprises a band 4, which is provided with an inwardly disposed flange 5 adapted to project between the end edges of the pipes 1 and 2, and outwardly turned end portions 6. The conventional coupling includes tie bolts 7 which are anchored at their opposite ends in coupling rings 8 and 9. Ordinarily disposed between the outwardly turned portions 6 and the inner faces of the rings are wedge gaskets which, when the tie bolts 7 are tightened, tightly wedge between said outwardly turned portions and the surface of the pipe so that a tight joint is ordinarily provided.

It often happens, in practice, that after a time the wedge gaskets become worn to such an extent that tightening of the tie bolts 7 will not prevent leakage of the fluid carried in the pipe from about the joint. Heretofore, when such a situation arises, it has been necessary to drain the pipe line and remove the coupling so that new gaskets may be installed thereon. This process of repairing the coupling is both very troublesome and extremely expensive when it is considered that a great many couplings are employed in a pipe line of any length.

To obviate this difficulty I have provided my improved clamp which is indicated in general by the numeral 11. My improved device comprises an outer ring 12 which is substantially reverse L-shaped in cross section, as best seen in Figure 6 of the drawings. The outer ring 12 is preferably formed in two sections and, as seen in Figure 4 of the drawings, each section is provided with a plurality of openings 13. The ring 12 is given added strength by means of an inwardly disposed overhanging flange 14 and radially disposed ribs 15. The arcuate inner portion of the ring 12 is formed with an annular wedge face 16 terminating at its upper edge in an overhanging flange 16'. The ring may be of any particular design, but I have employed a ring wherein the portions between the openings 13 are reduced in height and provided with longitudinal slots to effect a saving in material and reduction in weight. If desired, however, the ring may be of uniform radius. As best seen in Figure 1 of the drawings, the sections of the outer ring are formed so that the free ends of one of said sections are thickened to provide an overhanging tongue 17 which is adapted to overlie the end portion 18 of the mating section.

A tooth 19 is formed on the mating section 18 and is adapted to engage in a groove in the tongue 17 so that a tight fit will be provided. When mounted in opposite position on the pipe end which, as shown in Figures 1 and 2 of the drawings, the bottom portion of the ring is disposed toward the joint of the pipe and is adapted to terminate in close spaced relation to the ring 9 of the coupling 3. Carried about the pipe 1 is a wedge gasket 20 which may be formed of paranite, or other suitable flexible and durable material. The wedge gasket 20 is adapted for disposition beneath the wedge face 16 and flange 16' of the ring 12 and is adapted to be tightly clamped between said face 16 and the outer surface of the ring 9. The flange 16' will effectually retain the wedge gasket 20 in position against the wedge face 16 so that upward sliding of the wedge gasket will be prevented. Gaskets 100 are adapted to fit about and beneath the outwardly turned portions 6 of the band 5 so that said portions 6 will be effectually insulated from the rings 8 and 9.

Mounted to cooperate with the ring 12 is a ring 21 which is comprised of a plurality of sections, one of said sections being indicated by the numeral 22, as shown more clearly in Figure 3 of the drawings. The sections are of identical construction and therefore a description of one will suffice for all. A typical section comprises a central portion 23 having an arcuate inner portion 24 which is formed with a wedge face 25 which is bounded by downwardly and laterally projecting flanges 33 and 34. The central portion 23 is formed with an overhanging flange 26. Formed at one end of the section 22 is a connecting portion 27 which is reduced in thickness and is provided with an opening 28 and a cut away portion 29, said cut away portion being adapted to cooperate with a seating section for providing a bolt opening, such as is indicated at 30 in Figure 3. The opposite end portion of the section 22 is reduced in thickness in offset relation to the end 27 and is provided with an interlocking tongue 31 defining an opening 32 which is adapted to cooperate with the portion 29 of the preceding section to define a bolt-receiving opening. An opening 32' is provided in the interlocking tongue 31, which opening 32' is adapted to cooperate with the opening 28 of the preceding section for receiving a tie rod, to be described in more detail hereinafter. As best seen in Figure 1, the sections are mounted to permit the tongue 31 and portions 27 to be disposed to engage about the tie bolt 7 so that, when installing the ring 21, it will only be necessary to place the sections about the tie bolts 7. As seen in Figure 3, when the ring 21 is in assembled position, the arcuate portions 24 are disposed to form a complete wedging face for the entire ring. It will be seen that the ring 21 may be readily assembled without removing, or even displacing, the tie bolts 7. In practice, the ring is assembled with the wedge face 25 presented toward the ring 12 and away from the joint of the meeting pipes. Spaced openings 101 are provided medially of the ends of the section and serve to lighten the weight of each section.

Disposed between the wedge face 25 and the flared end 6 of the band 4 is a preferably paranite wedge gasket 35 which is formed with a wedge face to confront the wedge face 25. The wedge gasket is prevented from spreading under pressure by means of the downwardly and laterally projecting flanges 33 and 34. The wedge gaskets may be made in sections or in a strip for installation without removal of the coupling.

Connecting the rings 12 and 21 are tie rods 36 which are threaded at their opposite ends and are provided with nuts 37 and 38 which are tightened for shifting the rings toward each other and thereby tightly clamping the wedge gasket 35 between the wedge face 25 and the outwardly turned portion 6 of the band 4. Simultaneously with this tightening operation, the wedge gasket 20 is tightly compressed between the wedge face 16 of the ring 12 and the surface of the pipe 1. It will be seen that, by use of my ring, a double insurance against leakage from about the end of the coupling, to which my device is attached, is provided. The tie rods 36 extend through the openings 28 and 32 of the corresponding ends of the sections 22 and, in addition to connecting the rings 12 and 21, retain the ring 21 in assembled position. While my device is shown at but one end of the coupling, it is to be understood that, if desired, it could be placed on either or both ends of the coupling. If desired, two of my devices may be placed on the same coupling at the same time as a relatively small amount of lateral space is required for each coupling. It is particularly emphasized that the device may be installed without removing the original coupling from the pipe line so that draining of the pipe line and labor incident to removal of said original coupling will not be required. The device is characterized by the utmost simplicity and durability so that after installation no attention will be required to be given to the device for a long period of time.

The device is particularly effective for the reason that a tight joint is provided at each side of the end of the coupling and this is done without the use of a cover for the entire coupling. This construction is especially meritorius in view of the fact that such covers are extremely expensive and will, when in position, prevent free access to the clamp. In view of the fact that the gaskets are formed of a very durable material, they will not often require attention.

It is believed that, from the foregoing description, it will be seen that I have provided a clamp of this character which will very efficiently serve the purpose for which it is intended.

Having thus described my invention, I claim:

1. In combination with meeting ends of pipes, and a coupling connecting said meeting ends of pipes, said coupling comprising a band and rings connected by tie bolts, of a pair of rings fitted about a pipe end and cooperating with one of the rings of the coupling, wedge gaskets carried by said rings and engageable about a ring of said coupling, tie rods connecting the rings, and nuts carried by the tie rods and rotatable thereon for shifting the second-mentioned rings toward each other and clamping the gaskets between the rings and against the coupling whereby leakage about the coupling will be prevented.

2. In combination with meeting pipe ends, and a coupling comprising a band, rings at opposite ends of the band and tie bolts connecting said rings above the band, of a clamp comprising a pair of rings adapted for disposition at either side of one of the coupling rings, one of said rings being formed from a plurality of sections and being adapted for assembly about the coupling and the other of said rings being formed of a pair of sections adapted for assembly about a pipe end, tie rods connecting the rings, and gaskets carried by the rings and engageable with the coupling ring at either side thereof for providing a tight seal, said tie rods being adjustable for varying the tension of said gaskets against said coupling rings.

3. In combination with meeting pipe ends, and a coupling connecting said pipe ends, said coupling comprising a band having outwardly turned end edges, coupling rings and tie bolts connecting the coupling rings, of a clamp comprising a pair of rings, one of said rings being formed of a plurality of sections adapted for assembly about the band and the other of said rings being formed of a pair of sections for assembly about a pipe end, tie rods extending between the rings and retaining said first-mentioned sections in assembled relation about the band and certain of said rods retaining said second-mentioned ring in assembled relation about the pipe end, wedge gaskets carried at either side of the outwardly turned end portion of the band and engageable by said first-mentioned ring, and a wedge gasket carried adjacent one of the coupling rings, said tie rods being adjustable for shifting said first and second-mentioned rings toward each other and tightly clamping the gaskets about the ends of the band and rings whereby leakage about said coupling will be prevented.

4. A clamp including a pair of rings, one of said rings being mounted between rings of a pipe coupling, connecting means for said first mentioned rings, wedge gaskets, and means on said first mentioned means for shifting said first mentioned rings and the gaskets against the coupling whereby leakage about said coupling will be prevented.

5. A clamp including a pair of rings, one of said rings being mounted on tie rods of a pipe coupling and adapted to cooperate with a ring of said pipe coupling, tie rods connecting the rings, wedge gaskets carried by said first mentioned rings, and means on the second-mentioned tie rods for shifting said first mentioned rings and the gaskets against the coupling whereby leakage about said coupling will be prevented.

6. A clamp comprising a pair of rings each formed of a plurality of sections, each of said sections having an arcuate wedge face terminating in an overhanging flange, and all of said sections of each ring cooperating to form circular wedge faces for the rings, means connecting the rings and retaining said sections in operative position, one of said rings being carried on the tie rods of a pipe coupling between the rings thereof and a wedge gasket carried adjacent the wedge face beneath the overhanging flange of each of said rings and being adapted to engage opposite sides of a coupling for providing a tight seal at said coupling.

7. A clamp including a pair of rings, one of said rings being formed of a plurality of sections and the other of said rings being formed of a pair of sections, each section of the rings having a wedge face and all of said sections cooperating to form a circular wedge face for the rings, connecting means extending through the rings and retaining said rings in operative position, certain of said connecting means extending through the plurality of sections and certain of said connecting means extending through the pair of sections, and wedging means carried by the means adjacent the wedge faces thereof and adapted to engage opposite sides of a coupling for providing a tight seal.

8. A clamp including a ring adapted to be mounted on the tie rods of a pipe coupling, a second ring adapted to engage a pipe end, wedging means, means connecting the rings, and means for shifting the rings and said wedging means against a portion of the pipe coupling for preventing leakage about said coupling.

9. A clamp including a ring formed of a plurality of sections and adapted to be mounted on the tie rods of a pipe coupling, wedging gaskets, a second ring, tie rods connecting the rings, said first mentioned tie rods cooperating with said last mentioned tie rods for mounting the rings and preventing radial movement thereof, and means for shifting the wedging gaskets and rings against the pipe coupling for preventing leakage about the coupling.

10. In combination with the meeting ends of pipes, and a coupling connecting said meeting ends, said coupling comprising a band and rings connected by the tie rods, of a clamp including a ring carried on the tie rods, a ring carried on a pipe end, wedging gaskets, means connecting the last mentioned rings, and means for shifting the last mentioned rings and wedging gaskets against the pipe end for preventing leakage about the pipe ends.

ERIC M. BUCHAN. [L. S.]